Aug. 13, 1957     B. T. HENSGEN ET AL     2,802,658
WEIGHING METHOD AND APPARATUS
Filed June 16, 1954     6 Sheets-Sheet 1

| PRE-WEIGHT STATION | | |
|---|---|---|
| WEIGHT OF SIX RANDOM FRANKS | FRANKS TO BE ADDED | WEIGHT AFTER PRE-WEIGHING |
| 12.42 THRU 11.88 | ONE #E<br>2.23 THRU 2.06 | 14.65 THRU 13.94 |
| 11.87 THRU 11.26 | TWO #A<br>3.02 THRU 2.68 | 14.89 THRU 13.94 |
| 11.25 THRU 10.52 | TWO #C<br>3.64 THRU 3.42 | 14.89 THRU 13.94 |
| 10.51 THRU 9.82 | TWO #E<br>4.44 THRU 4.12 | 14.95 THRU 13.94 |
| 9.81 THRU 8.92 | THREE #C<br>5.46 THRU 5.13 | 15.27 THRU 14.05 |

| MAKE-WEIGHT STATION | | |
|---|---|---|
| RANGE AT MAKE WEIGHT SCALE | FRANKS TO BE ADDED | FINAL WEIGHT |
| 13.94 THRU 14.16 | #E<br>2.06 THRU 2.22 | 16.00 THRU 16.38 |
| 14.17 THRU 14.28 | #D<br>1.83 THRU 2.05 | 16.00 THRU 16.33 |
| 14.29 THRU 14.47 | #C<br>1.71 THRU 1.82 | 16.00 THRU 16.29 |
| 14.48 THRU 14.65 | #B<br>1.52 THRU 1.70 | 16.00 THRU 16.35 |
| 14.66 THRU 14.87 | #A<br>1.34 THRU 1.51 | 16.00 THRU 16.38 |
| 14.88 THRU 15.27 | #A<br>1.34 THRU 1.51 | 16.22 THRU 16.78 |

*Fig. 1*

BERNARD T. HENSGEN
WILLIAM E. PALMER
RALPH M. FAUST
INVENTORS

BY R. G. Story
ATTORNEY

PRE-WEIGHT STATION

| WEIGHT OF SIX RANDOM FRANKS | FRANKS TO BE ADDED | WEIGHT AFTER PRE-WEIGHING |
|---|---|---|
| 12.42 THRU 11.93 | ONE #9<br>2.22 THRU 2.13 | 14.74 THRU 14.06 |
| 11.92 THRU 11.23 | TWO #1<br>2.84 THRU 2.66 | 14.76 THRU 13.89 |
| 11.22 THRU 10.43 | TWO #5<br>3.64 THRU 3.46 | 14.86 THRU 13.89 |
| 10.42 THRU 9.61 | TWO #9<br>4.44 THRU 4.26 | 14.86 THRU 13.87 |
| 9.60 THRU 8.92 | THREE #5<br>5.46 THRU 5.19 | 15.06 THRU 14.01 |

MAKE-WEIGHT STATION

| RANGE AT MAKE WEIGHT SCALE | FRANKS TO BE ADDED | FINAL WEIGHT |
|---|---|---|
| 13.87 THRU 13.97 | #9<br>2.13 THRU 2.22 | 16.00 THRU 16.19 |
| 13.98 THRU 14.07 | #8<br>2.03 THRU 2.12 | 16.01 THRU 16.19 |
| 14.08 THRU 14.17 | #7<br>1.93 THRU 2.02 | "    "    " |
| 14.18 THRU 14.27 | #6<br>1.83 THRU 1.92 | "    "    " |
| 14.28 THRU 14.37 | #5<br>1.73 THRU 1.82 | "    "    " |
| 14.38 THRU 14.47 | #4<br>1.63 THRU 1.72 | "    "    " |
| 14.48 THRU 14.57 | #3<br>1.53 THRU 1.62 | "    "    " |
| 14.58 THRU 14.67 | #2<br>1.43 THRU 1.52 | "    "    " |
| 14.68 THRU 14.95 | #1<br>1.33 THRU 1.42 | 16.01 THRU 16.37 |
| 14.96 THRU 15.06 | #1<br>1.33 THRU 1.42 | 16.38 THRU 16.48 |

Fig. 2

BERNARD T. HENSGEN
WILLIAM E. PALMER
RALPH M. FAUST
INVENTORS

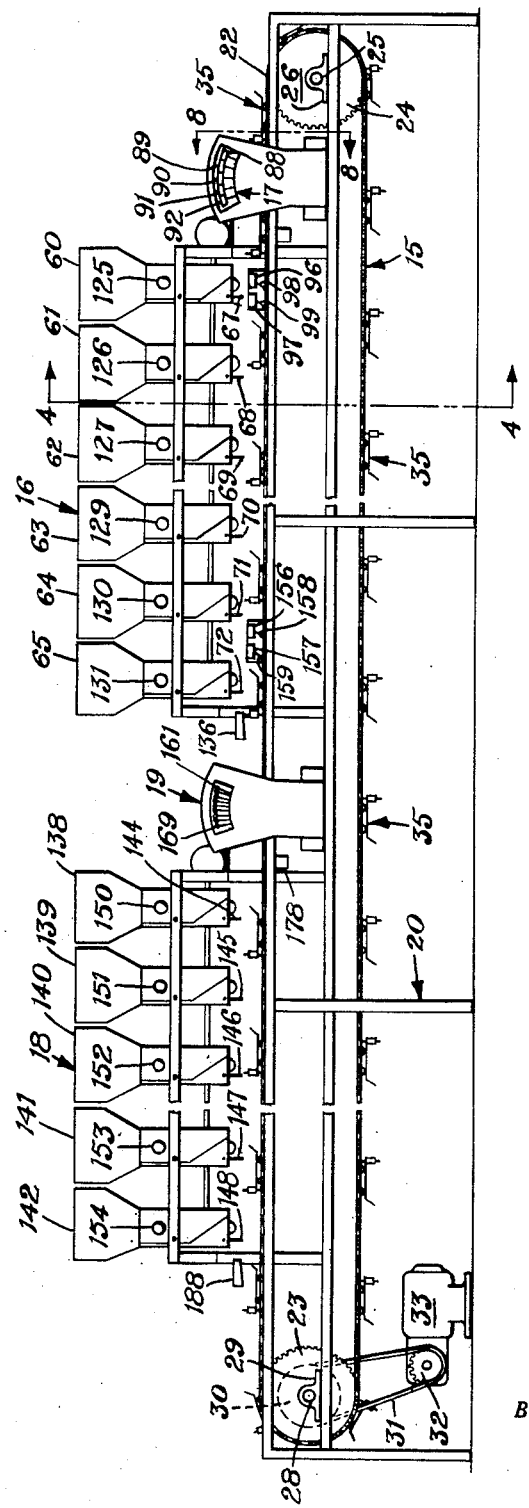

Aug. 13, 1957     B. T. HENSGEN ET AL     2,802,658
WEIGHING METHOD AND APPARATUS
Filed June 16, 1954     6 Sheets-Sheet 4
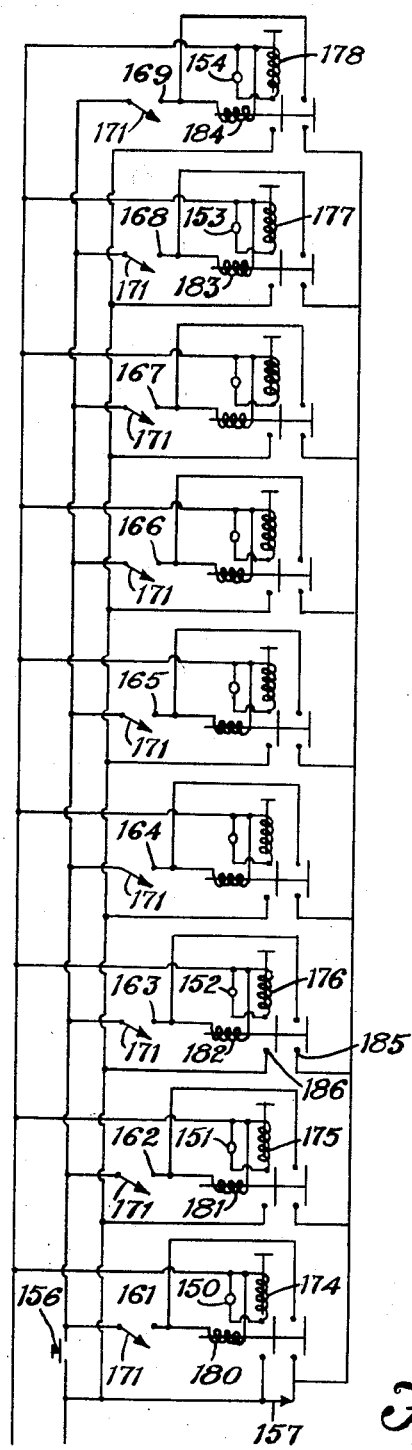
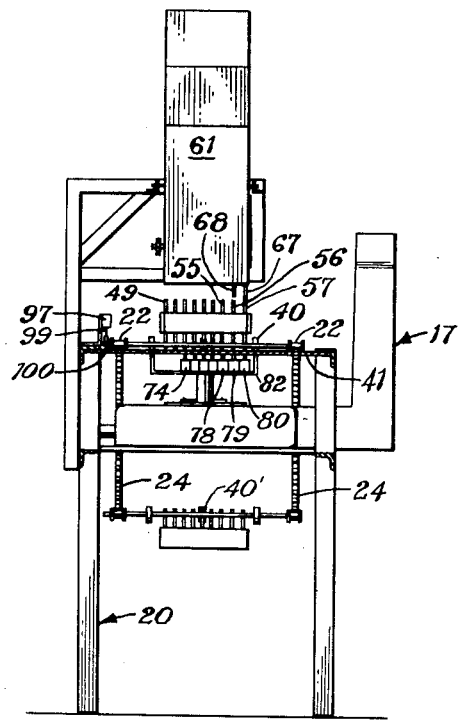
Fig. 4
Fig. 5
BERNARD T. HENSGEN
WILLIAM E. PALMER
RALPH M. FAUST
INVENTORS
BY R. G. Story
ATTORNEY

BERNARD T. HENSGEN
WILLIAM E. PALMER
RALPH M. FAUST
INVENTORS

BY R. G. Story
ATTORNEY

BERNARD T. HENSGEN
WILLIAM E. PALMER
RALPH M. FAUST
INVENTORS

BY R. G. Story

ATTORNEY

United States Patent Office

2,802,658
Patented Aug. 13, 1957

2,802,658

WEIGHING METHOD AND APPARATUS

Bernard T. Hensgen and William E. Palmer, Chicago, and Ralph M. Faust, Westchester, Ill., assignors to Swift & Company, Chicago, Ill., a corporation of Illinois Application June 16, 1954, Serial No. 437,082

6 Claims. (Cl. 265—27)

The present invention relates to a method and apparatus for use in assembling a number of units of product each having a weight falling within a predetermined range into a group, preferably of a given number of units, having a weight falling within a given range. The specific embodiment of the invention hereinafter described was devised for use in preparing one-pound packages of sausages, such as frankfurters.

The majority of the frankfurters sold retail are in packages of a predetermined weight such as one pound. Preferably those packages contain a given number of frankfurters, as for example 9, although the weight is used as the determining factor in the selling price rather than the number of frankfurters. If the cost of the frankfurters retail were based on the number of frankfurters, imperceptible variations in size would substantially influence the quantity actually being sold and the purchaser would not be able to detect the difference. It would be possible to sell the frankfurters on a weight basis with a given number of frankfurters being put in each package and then the weight of the package being subsequently determined and stamped on the outside (catch-weight system). However, in such a case the purchaser in the store could not readily determine the comparative price of competing products, at least without considerable calculation, because of the total price for each package varying with the variance in weight. This would also make more work for the vendors in pricing the products.

If a pound of frankfurters is to contain 9 units, each of these individual units should weigh 1.78 ounces. However, under present day practices it is substantially an impossibility to produce all frankfurters so that each has exactly this weight. As a matter of fact, a spread of from about 1.53 ounces to about 2.03 ounces is regularly encountered in plants endeavoring to meet such a standard. Various factors will contribute to this result; such as, variations in the formulation of the product before cooking, failure to obtain complete homogeneity in the mix, stuffing pressures and procedure, local variations in the size of the casing employed, changes in length caused by the pinching off of the casing, etc., variation in the cooking conditions, and variation in general atmospheric conditions.

In the majority of instances the scaling today is a manual operation. In theory the individual doing the scaling will pick out nine frankfurters at random and put them on the scale. If the weight is within the allowable tolerance the individual will proceed to wrap those frankfurters or pass them along to a wrapping station. If the weight is over the allowable tolerance, the individual by eye will pick out a large frankfurter from the group of nine and by eye will substitute a smaller frankfurter, repeating this as many times as may be necessary to bring the weight of the group to within the allowable tolerance. Similar procedures are followed when the initial group of nine is underweight. In some instances it is necessary to substitute several frankfurters for one or vice versa, which necessarily will change the number of frankfurters in the package.

In actual practice it often does not work this way. Individuals working on a piece work or incentive system will be more interested in turning out packages than they will be in staying within the tolerance. Even without this factor being present, the individuals will become careless. Errors in weight on the low side, resulting in packages weighing less than one pound, create ill will among customers and bring action by the Weights and Measures authorities, while errors on the high side, that is producing packages weighing substantially greater than one pound, result in the producer giving away product.

While it might seem that only a fraction of an ounce, or even an ounce or more, in a pound of frankfurters is very small and not likely to cause any particular loss to the producer, the accumulation of such errors over large volumes can run into very substantial sums of money. After all, one ounce in a pound is over 6%, which is often considered to be a good return and certainly it is in the meat business where a successful company's earnings are in the neighborhood of one cent on each dollar of sales.

The principal object of the present invention is to provide a relatively simple method and apparatus for producing groups of frankfurters which will have a given weight within a reasonable tolerance and which preferably will obtain a given number of frankfurters. Two immediate and substantial advantages are realized by achieving this object. The first is the elimination of a very substantial amount of hand labor which is costly as compared to machine operations. The second is the reduction or elimination of the human element whereby the initially determined allowable tolerance is maintained for all packages turned out.

A second object of the present invention is to provide a method and apparatus wherein it is not necessary to weigh each individual frankfurter. In the past there have been some proposals, where similar problems have been encountered, to classify each unit by weight and then to assemble a group of units by choosing one or more of each of the various classes to make up a group having the desired end weight. The step of weighing each individual frankfurter to determine its classification is laborious, time consuming and expensive. Furthermore, the selecting of the classes to make up a group will often have to be continually varied because of excesses or shortages in particular classes which must be continually taken into account. In the present invention only about 30% of the total number of frankfurters are individually weighed, thus substantially reducing the work involved.

In some other fields where similar problems have been encountered it has been possible to employ partial units and to break up the units to achieve the desired percentage of a unit to obtain the desired weight. Obviously this is not practical with such products as those with which this invention deals because a purchaser would not care to buy a package of product having a fraction of a frankfurter in it in addition to a number of whole frankfurters.

A further advantage of the invention is the ability to increase the standards of sanitation. The equipment can be readily cleaned and the ability to handle the product, at least in the main, by machinery lessens the possibility of contamination.

Further objects and advantages lie in the simplicity of the equipment making it relatively low in capital investment, keeping the maintenance cost at a minimum and enabling the machine to be maintained by individuals not having highly specialized skills, a high standard of reliability making continuous checking of the assembled groups of units unnecessary, and the adaptability of the machine for incorporation in continuous mechanical packaging lines.

Other objects and advantages will become apparent from the following description taken in conjunction with the drawings, in which:

Figure 1 is a chart illustrating the procedure in making weight for a group in accordance with the present invention;

Figure 2 is an alternative procedure of making weight, to achieve closer tolerances;

Figure 3 is a side elevation of an embodiment of the invention;

Figure 4 is a section taken at line 4—4 of Figure 3;

Figure 5 is an electrical diagram of the coding means for the final make weight;

Figure 6:
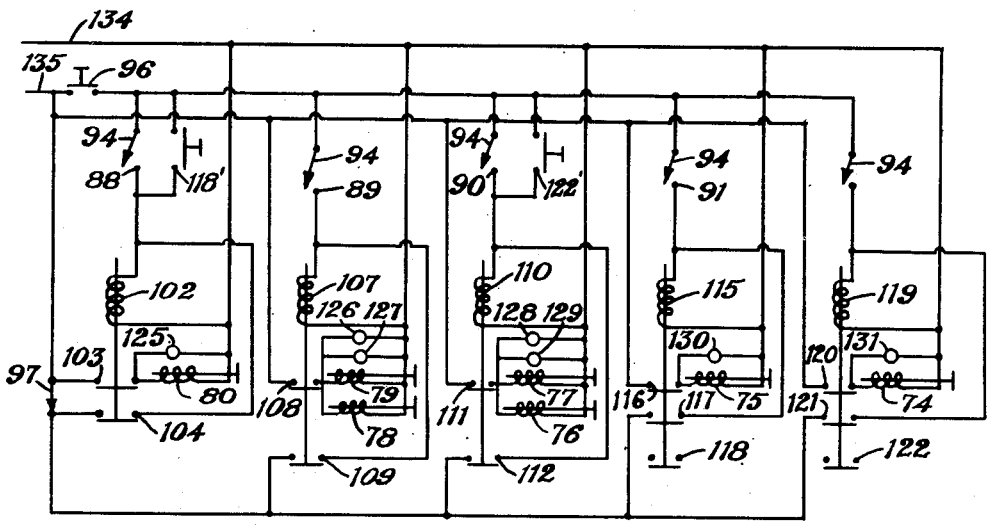
Figure 6 is an electrical diagram for the coding means of the preweight.

In the process of the present invention a portion of the completed frankfurters are classified by weight into a plurality of lots. If it is a representative portion, the amounts so classified need be less than only about 30 percent of the total frankfurters to be packaged. An initial group of frankfurters is then chosen at random from the remaining portion of the frankfurters. The number of frankurters chosen in this initial group will be at least two less than the desired number of frankfurters in the finished group, and in accordance with the process hereinafter described in detail, the initial group is three less than the desired number in the finished group. The initial group is then weighed and one or more frankfurters are added to the initial group to make up a subgroup. The added frankfurters are selected from the classified lots so as to bring the total weight of the initial group within a prestandardized range. To avoid having to choose exactly identical frankfurters for each of the lots when the lots are made up, certain tolerances are allowed for each of the lots. Tolerances are also allowed in the weight of the initial group in selecting the frankfurters from the lots. Thus, when one or more frankfurters are chosen from the lots to make up the subgroup, there will be variations in the weight of the subgroup within the prestandardized range.

The subgroup is then weighed and one, and in some embodiments more, frankfurters are again selected from the classified lots to bring the final group to the desired weight within a predetermined tolerance. Again, in this step, there are allowable tolerances in both the weighing of the subgroup and in the weight of the frankfurters within the lots, yet the final tolerances can be maintained.

The allowance of tolerances throughout each step of the process, while still maintaining a final tolerance sufficiently close to prevent the giving away of substantial amounts of product (or to have underweight packages) is an important feature of this invention. A machine not involving these tolerances throughout the process would require almost an infinite number of combinations and would be extremely complicated. The embodiments following the process outlined maintain extreme simplicity; yet there is no cumulative effect of tolerances to give a wide variation in the total weight of some of the groups produced by the machine. An extremely high percentage of the groups produced by the machine will be far within the small finished tolerance and will be extremely close to an exact weight.

The use of a two-step process; that is, one in which there is a preweighing of a given group of units with a semistandardization of that group by the addition of one or more additional units to produce a subgroup, followed by a further weighing of the subgroup and the addition of one or more units to make up the weight of the finished group, is an important feature of the present invention, because it is this factor that permits the use of tolerances and prevents the necessity of weighing and selecting units to substantially an exact figure. It will be apparent that when tolerances are permitted there is the possibility of a cumulative effect of the tolerances that will result in a great error in the finished result. This does not occur with the present invention.

Figures 1 and 2 are illustrative of two procedures following the foregoing process where it is sought to assemble nine frankfurters into a group weighing one pound. The procedure of Figure 1 is substantially more simple than the procedure of Figure 2; yet, the extreme tolerance in the finished group is only a very small percentage greater following the procedure of Figure 1 than it is following the procedure of Figure 2.

On a theoretical basis it is possible that there is a small percentage of the groups of frankfurters that will not fall within the tolerances set forth in Figures 1 and 2. With the method of Figure 1 there is a theoretical possibility that approximately 5% of the packages will fall outside of the ⅜ ounce tolerance that is sought to be achieved. With the method of Figure 2, there is a theoretical possibility that approximately .3% of the packages will fall outside of a ⅜ ounce tolerance. With the method of Figure 2, 100% of the packages will be within .45 of an ounce tolerance and a very high percent of the packages will be within .2 of an ounce. It will be a matter of economics in any particular instance as to whether or not the saving resulting from the closer tolerances will justify the additional structure required to achieve the closer tolerance.

Referring specifically to the method of Figure 1, approximately 30 percent of the complete amount of frankfurters to be packaged are classified into five groups by weight. In Figure 1 these groups have been designated by the letters A through E. The weights of each of these groups are as follows:

| Group | Weights |
|---|---|
| A | 1.34 through 1.51. |
| B | 1.52 through 1.70. |
| C | 1.71 through 1.82. |
| D | 1.83 through 2.05. |
| E | 2.06 through 2.22. |

In some instances the very small and very large frankfurters to make up the end groups can be obtained from the regular run. In other instances they may have to be specially made as by making up some frankfurters using undersized and oversized casings.

Six frankfurters are then selected at random from the remaining unweighed frankfurters and the six frankfurters are preweighed. If the range in weight of the individual frankfurters is from 1.53 ounces to 2.03 ounces, conceivably these six frankfurters can weight from 9.18 to 12.18 ounces. One or more of the frankfurters from a classified group are added to the six frankfurters to bring the weight of the subgroup within a prestandardized range. For example, if the six frankfurters weigh 10.76 ounces, two number C frankfurters will be added to bring the total weight to within the range of 14.18 ounces to 14.40 ounces, a range within the standardized range for the completion of the preweight step. The subgroup of eight is again weighed and one additional frankfurter is added depending upon the classification of the group of eight. Assume that the eight frankfurters after the addition of the two number C frankfurters weighed 14.25 ounces. One additional number D frankfurter would be added to bring the finished weight within the range of 16.08 to 16.30 ounces for the complete group of nine frankfurters.

In no event will the complete group of nine weigh less than one pound. It will be noted, when the weight of the initial six frankfurters is very small and three number C frankfurters are added, followed by one number A, conceivably it is possible to get as high as 16.78 ounces for the finished package. However, a little study will reveal the extremely small possibility of this occurring. Not only must the initial six frankfurters all be from one end of the range of weight of frankfurters, but the three number C frankfurters and the one number A frankfurter all must be from one end of the classification range for these types of frankfurters. Thus, the incidence of this situation occurring will be extremely rare. The very large majority of the packages will be well within the finished tolerance of from one pound to one pound and ⅜ ounce.

The majority of the packages processed will contain nine frankfurters. In seeking to make a package from frankfurters weighing 1.78 ounce each, by far the greater percentage of the initial groups of six frankfurters will fall within the range of 9.82 ounces to 11.82 ounces and within this range two frankfurters will be added at the preweight station, with one frankfurter being added at the final-weight station. Where the initial six frankfurters are very heavy, only one additional frankfurter will be added at each station to produce a package of eight. Where the initial six frankfurters are very light, three additional frankfurters are added at the pre-weight station followed by one additional frankfurter at the make-weight station for a total of ten.

Figure 2 illustrates a method employed where closer tolerances are desired. Approximately 30 percent of the frankfurters to be sold are classified into nine weight classifications as follows:

| Number: | Weight |
|---|---|
| 1 | 1.33 through 1.42. |
| 2 | 1.43 through 1.52. |
| 3 | 1.53 through 1.62. |
| 4 | 1.63 through 1.72. |
| 5 | 1.73 through 1.82. |
| 6 | 1.83 through 1.92. |
| 7 | 1.93 through 2.02. |
| 8 | 2.03 through 2.12. |
| 9 | 2.13 through 2.22. |

Except for this difference in classification and for a difference in the dividing points at which various combinations of frankfurters are added, the procedure in the method of Figure 2 is the same as that described for the method of Figure 1. However, as will be noted from the figures, the tolerance limits are much closer for Figure 2 than they are for Figure 1. In each instance it should be recognized that these are the limits of tolerance and on a percentage basis the majority of the packages will be at amounts within these limits. In the method of Figure 2 as in the method of Figure 1, the majority of the packages will contain nine frankfurters. A few, where the initial six frankfurters were very heavy, will contain eight frankfurters, while in the case of the initial six frankfurters being very light, the final package will contain ten frankfurters.

To trace through a specific example, assume that the initial six frankfurters selected at random weigh 9.92 ounces. In this case reference should be made to the next to last line of the weight range chart for the preweight station at the top of Figure 2, and it will be seen that two number 9 frankfurters should be added. Assuming that these two number 9 frankfurters weigh 4.33 ounces, the total weight of the subgroup of eight frankfurters will be 14.25 ounces, with this being the weight determined for the subgroup at the second weighing and the subgroup falling within the classification of 14.18 through 14.27 at the make-weight station. To this subgroup one number 6 frankfurter is added, as will be seen from the fourth from the top line of the weight range chart for the make-weight station. Assuming that the number 6 frankfurter weighs 1.88 ounces, the total weight for the nine frankfurters will be 16.13 ounces.

Figures 3 through 7 illustrate a machine that, with minor modifications, may be employed for performing the methods of either Figure 1 or Figure 2, although it is intended specifically for the method of Figure 2. Individual bins or magazines are employed to hold the various classes of frankfurters. If the method of Figure 1 is to be used, there should be seven bins in the preweight section of the machine and five bins in the make-weight section if complete mechanical operation is employed. Where hand labor is substituted for the mechanical dispensing, the number of bins in the preweight section can be reduced to four. To carry out the method of Figure 2, for complete mechanical operation, seven bins are needed in the preweight section and nine bins are needed in the make-weight section.

Referring to Figure 3, the machine comprises a conveyor generally 15 on which the groups are assembled, a preweight section including a dispensing bank generally 16 and a scale generally 17, and a make-weight section including a dispensing bank generally 18 and a scale generally 19. The complete machine is mounted on a frame generally 20.

The conveyor 15 includes a pair of endless chains 22 trained for movement about sprockets 23 and 24. Sprockets 24 are idler sprockets mounted on a shaft 25 suitably journaled in bearings 26. Similarly, sprockets 23 are attached to a shaft 28 journaled in bearings 29. A sprocket 30 is attached to shaft 28 and is driven by a chain 31 from a sprocket 32 mounted on the output shaft of a gear head motor 33.

Figure 7:
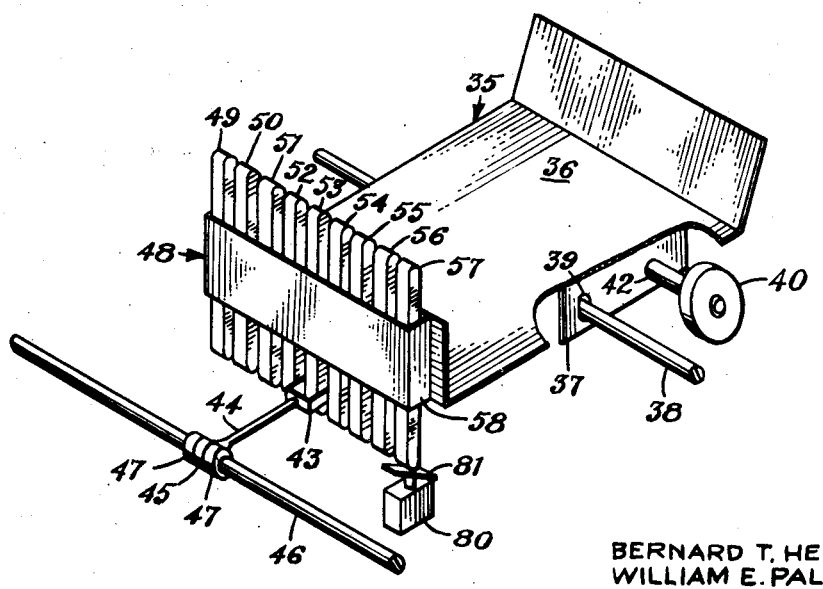
Figure 7 is an isometric view of one of the pans on which the frankfurters are assembled in the embodiment illustrated in Figures 3 and 4.

A plurality of assembly pans generally 35 are mounted between chains 22 for movement along a given path of travel to carry the frankfurters and assemble the groups of frankfurters. The structure of the pans is best seen in Figure 7. The pans include a tray 36 having depending four flanges 37. A rod 38 passes through elongated openings 39 in the outside flanges 37 and at each end the rod is attached to one of chains 22. Opening 39 is elongated in a vertical direction to prevent movement of the tray 36 with respect to the rod 38. The pan rides on two rear wheels 40 and a front wheel 40′ which are supported on the top platform 41 of frame 20. Rearwardly of rod 38 an axle 42 projects at each side of flange 37 with wheels 40 being rotatably mounted on the axle 42 at each side of the tray 36. Wheel 40′ is mounted on a front axle 42′.

A yoke 43 projects forwardly from tray 36 to support a draw bar 44. Yoke 43 is pivotally attached to axle 42′. At its forward end draw bar 44 has an enlarged boss 45 having a circular opening therein to slide over a rod 46 secured to each of chains 22. A pair of bushings 47 at each side of the boss 45 centers draw bar 44 with respect to rod 46, yet permits the draw bar to pivot on rod 46. Each of pan assemblies 35 carries a coding means generally 48 comprising a plurality of trip fingers, 49 through 57, slidably mounted in a holder 58. Each of fingers 49—57 is movable individually in holder 58, with sufficient friction between the fingers and the holder for the fingers to maintain any set longitudinal position in the holder until forceably moved to another position. The exact number of trip fingers will vary with specific embodiments. Since the embodiment illustrated and described is for the purpose of carrying out either of the methods illustrated by Figure 1 or 2, a total of nine trip fingers is employed.

The preweight dispensing bank 16 includes seven individual magazines, only six of which are illustrated in Figure 3. Each of these magazines is identical except for the position of the control lever for ejecting a frankfurter. The six magazines illustrated in Figure 3 are numbered 60 through 65. The details of the structure of each of the magazines forms no part of the present invention. Any one of various types of magazines might be employed which would feed one unit at a time from the magazine in response to a tripping of the actuating levers. The actuating levers for magazines 60 through 65 are numbered 67 through 72, respectively. For frankfurters we prefer to use a magazine of the type disclosed and claimed in U. S. patent application Number 307,851, the disclosure of which is incorporated herein by reference.

Actuating levers 67—72 are staggered across the path of the assembly pans 35 with each one of the actuating levers being in the path of a respective tripping finger. This is best illustrated in Figure 4, where actuating lever 67 is aligned with the path of finger 57 and actuating lever 68 is aligned with the path of trip finger 56. The remaining actuating levers 69—72 and the one for the magazine that does not show in Figure 3 are aligned with one of the trip fingers 49—55, respectively. In the preweight dispensing bank 16 there are only seven magazines so that not all of the trip fingers are utilized in this section. The trip fingers 49—56 in Figure 4 are in what may be termed the inactive position inasmuch as the tops of the fingers are below the bottom of the respective actuating levers so that they will not produce a discharge of a frankfurter by contact with the actuating levers. Actuating lever 57 on the other hand is in what might be termed the active position inasmuch as it has been pushed up (by a structure to be described hereinafter) so that as it is moved along the conveyor it will contact actuating lever 67 to discharge a frankfurter from magazine 60.

Trip fingers 51—57 are pushed up by the plungers associated with solenoids 74—80, respectively. Each of the plungers of the solenoids has a pressure plate affixed to the top thereof. Pressure plate 81 for solenoid 80 appears in Figure 7. The solenoids are mounted on a U-shaped bracket 82 secured to platform 41 of frame 20. Suitable openings (not shown) are provided in platform 41 above the plungers associated with the solenoids so that the plungers will extend through the platform to push up the trip fingers 51—57 when desired.

Figure 8:
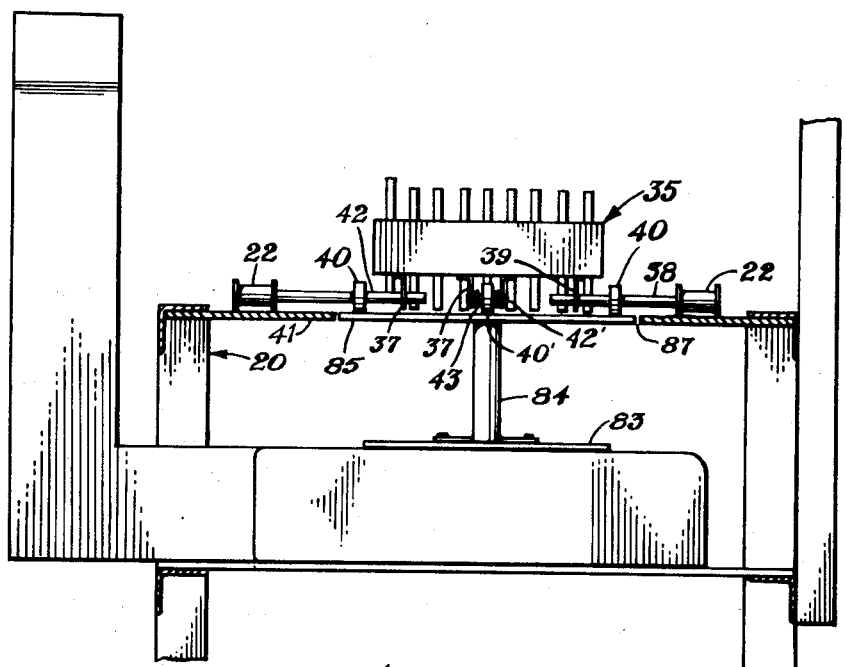
Figure 8 is a partial section taken at line 8—8 of Figure 3.

The details of the structure of scale 17 form no part of the present invention. The scale has a platform 83 (Figure 8) normally employed to support the object to be weighed. A post 84 is attached to the platform 83 with a second platform 85 being mounted on the top of the post. Platform 85 is positioned in an opening 87 in the frame platform 41 in a position to be traversed by the assembly pans 35 as they move along the path dictated by the conveyor. Platform 85 is sufficiently large so that the wheels 40 of the assembly pans will rest upon the platform. In the manner well known in the art, the scale 17 is adjusted to be at zero when one of assembly pans 35 is on the second platform 85.

The scale 17 has five commutator contacts 88 through 92, positioned to be wiped by a contact on the indicator arm of the scale as the indicator arm moves in response to weight being placed upon the weight responsive elements of the scale. The length and position of the scale of the commutator elements will depend upon the weight ranges used in the actual method being employed. In utilizing the method of Figure 2, element 88 corresponds to a weight range of 12.42 through 12.02; element 89 corresponds to a weight range of 11.92 through 11.32; etc. The wiper on the scale arm forms a switch with each of the commutator contacts.

Referring to Figure 6, which is a schematic diagram of the electrical circuit for actuating the solenoids in response to the weight of a particular group of six frankfurters on one of assembly pans 35, the commutator contacts are shown as a part of separate switches. As will be apparent in the description, in actual practice this is a single-pole, five-throw switch, rather than five single-pole, single-throw switches as illustrated. The common number 94 has been applied to each of the five switch arms illustrated, inasmuch as in the actual scale it is a single switch arm.

Two snap action switches 96 and 97 (Figure 3) are positioned adjacent one side of the path of the conveyor, with the respective switch arms 98 and 99 intersecting the line of movement of a pin 100 (Figure 4) projecting from the side of chain 22. Switch 96 is a normally opened switch, and switch 97 is a normally closed switch (Figure 6).

In the control circuit for solenoid 80 is a relay 102 having two normally opened pairs of contacts 103 and 104. Similarly, a relay 107 associated with solenoids 78 and 79 has two sets of normally opened contacts 108 and 109, respectively, and a relay 110 has two sets of normally opened contacts 111 and 112, respectively.

A relay 115 is associated with solenoid 75 and has three sets of normally opened contacts 116, 117 and 118. Associated with solenoid 74 is a relay 119 having three sets of normally opened contacts 120, 121 and 122. Contacts 118 of relay 115 are wired in parallel with switch 94 but to simplify the diagram the contacts 118 are shown at 118', opposite switch 94—88. Similarly, contacts 122 are shown at 122' where they are wired in parallel with switch 94—90. It, of course, is understood that elements 118 and 118' are the same elements, while elements 122 and 122' are the same elements.

A light 125 is affixed to the front of magazine 60 and is wired in parallel with solenoid 80, solenoid 80 being the coding solenoid for tripping magazine 60. Similarly, lights 126 and 127 are fixed to the front of magazines 61 and 62, respectively, and are wired in parallel with solenoids 79 and 78, since these two solenoids are the coding solenoids for magazines 61 and 62, respectively. Lights 128 and 129 are wired in parallel with solenoids 76 and 77. Light 128 is not shown in Figure 3 since the respective magazine does not appear in the view. Light 129 is on the front of magazine 63 for which solenoid 76 is the coding solenoid. Lights 130 and 131 are in parallel with solenoids 75 and 74, respectively, and are mounted on the front of magazines 64 and 65, respectively.

Power is supplied from a suitable source of electrical energy (not shown) through wires 134 and 135. Each of contacts 104, 109, 112, 117 and 121 of relays 102, 107, 110, 115 and 119, is connected through switch 97 to wire 135 and one end of the respective relay coils with the other end of the coils being connected to wire 134. Thus, these contacts serve to hold the respective relays in actuated position, after initial actuation by wiper arm 94, as long as switch 97 remains closed. The remaining contacts of each of the relays serve to actuate one or more solenoids and lights.

As a specific example for the method following Figure 2, assume that the initial six frankfurters selected at random weighed 11.52 ounces. Thus, when the scale comes to rest wiper arm 94 will be on commutator contact 89. Switch 96 is positioned so that as soon as the scale has a chance to come to rest, switch 96 will be closed by pin 100 contacting switch arm 98. This completes a circuit from wire 135 through contact 89, relay coil 107, to wire 134 to energize the relay and close the contacts 108 and 109 of the relay. Switch 97 is closed so contacts 109 would serve to lock the relay 107 in energized position.

Contact 108 will complete a circuit from wire 135 through solenoids 78 and 79 and lights 126 and 127 to wire 134. The lighting of lights 126 and 127 indicates that the particular assembly pan on the scale needed a frankfurter from each of the magazines 61 and 62 on which these lights were positioned. Each of these two magazines in the specific instance would hold and deliver number 1 frankfurters.

The energizing of solenoids 78 and 79 raises the plungers of each of these solenoids and the cam platforms on the top of the plungers push up trip fingers 55 and 56, respectively (see Figure 4). Since the assembly pan would continue to move, pin 100 would soon strike actuating lever 99 of switch 97. Switch 97 thereby is opened to break the holding circuit through relay coil 107 to allow the relay to drop out and break the circuit through solenoids 78 and 79 and lights 126 and 127. However, trip fingers 55 and 56 remain in the raised or active position. Upon the pan 35 moving past each of the magazines 61 and 62, for which the pan has now been coded, the respective tripping fingers 55 and 56 contact the actuating levers 69 and 68, respectively, of magazines 62 and 61, respectively, to discharge a frankfurter from those magazines onto the pan.

The repetition of the foregoing for each of the magazines is believed to be unnecessary and would be merely redundant. The closing of switch 94—88 energizes solenoid 80 to code the particular pan so that one number 9 frankfurter will be discharged from magazine 60 onto the pan when that pan is below the magazine. Referring back to Figure 2, this would correspond to a weight of six frankfurters of between 12.42 and 12.02.

In the case where two number 9 frankfurters are to be added at the preweight station, one of these can be obtained from magazine 60 for which finger 57 is coded by the solenoid actuated by switch 94—88, and provision is made to actuate this control circuit as well as the control coding circuit for magazine 64 which also contains number 9 frankfurters. Similarly, in obtaining three number 5 frankfurters, the coding controls for the magazine not shown and magazine 63 are actuated as well as the control for magazine 65. For example, assume that the initial weight of the six frankfurters was between 10.42 ounces and 9.62 ounces. In this instance, switch 94—91 would be closed to energize relay 115. This relay would lock closed in the usual manner and the contact 116 would energize solenoid 75 to code trip finger 52 to move actuating lever 72. The closing of contacts 118 (118') which are in parallel with switch 94—88 would energize relay 102 to lock that relay closed. This would energize solenoid 80 to code trip finger 57 so as to subsequently move actuating lever 67. Thus a frankfurter would be obtained from magazines 60 and 64. Relay 110 would be energized in a similar manner upon the closing of contacts 122 (122') in response to the closing of switch 94—92.

A cam 136 is mounted on frame 29 and positioned across the path of the trip fingers 49—57 at the end of the dispensing bank 16. This cam serves to contact any trip fingers that have been raised into the active position and to press them down into the inactive position so that the fingers are ready to be coded as the particular assembly pan 35 traverses the make-weight station represented by scale 19 and dispensing bank 18.

As previously explained, at the make-weight station of the method of Figure 2, one of nine different frankfurters is obtained from one of nine separate magazines, five of which are shown in Figure 3. These are magazines 138—142 having trip levers 144—148, respectively. Lights 150—154 are mounted on the front of magazines 138—142, respectively. A pair of switches 156 and 157 having actuating levers 158 and 159 to contact pin 100 are employed in the same manner as previously described switches 96 and 97.

Scale 19 corresponds to scale 17 except it has nine commutator contacts 161—169, rather than five, which contacts form switches with the wiper 171 of the weight responsive arm of the scale. Solenoids 174—178 are controlled by relays 180—184, respectively, and are the coding solenoids for magazines 138—142, respectively.

Assume that eight frankfurters weighing 14.15 ounces are received on scale 19. The trip fingers 49—57 are all in the inactive position, having been decoded by contact with cam 136. The weight responsive arm of scale 19 reaches the point of travel where the wiper 171 makes connection with commutator contact 163. When switch 156 is closed by pin 100, relay 182 is energized and contacts 185 of relay 182 lock the relay in, while contacts 186 light the light 152 to indicate that one number 7 frankfurter is needed from magazine 140 and at the same time solenoid 176 is energized to code trip finger 55 so that it will contact actuating lever 146 to deposit a frankfurter from that magazine onto the particular pan 35 in which the eight frankfurters are contained when that pan is below magazine 140. No other trip fingers being raised into the active position, this will be the only frankfurter deposited in that assembly pan and it will bring the total weight of the pacakge to within the range of 16.08 to 16.17 ounces, the exact weight depending upon the exact weight of the number 7 frankfurter which is added. As the pan passes cam 188 at the rear of the dispensing bank 18, the raised trip finger 55 will again be depressed into the inactive position.

From the foregoing description it will be readily apparent that various modifications may be made without departing from the spirit of the instant invention. The description of a specific embodiment was made for the purpose of complying with 35 U. S. C. 112 and should not be construed as imposing unnecessary limitations upon the appended claims. One example of such a modification would be in the case where automatic dispensing of the frankfurters was not desired for reasons of economy in construction or otherwise. In such a case either the lights 125—131 and 150—154 on the magazines or bins would indicate to an operator from which bin a frankfurter should be taken manually to be deposited on a particular assembly pan. The coding of the trip fingers 49—57 might similarly be employed to advise operators just what frankfurters to add to a given pan.

We claim:

1. The method of assembling a number of similar units of food product into a group of approximately a given number of units having a weight falling within a given range, said method comprising dividing a portion of said units into a plurality of lots of individual units, each lot having only units falling within a given range of weights; selecting at random a determined number of the remaining portion of said units, said determined number being at least two less than said given number; weighing said determined number; adding to said determined number at least one unit from the lot of a range which will bring the weight of the determined number plus the addition into a prestandardized range; weighing the determined number plus the addition; and adding, to make the group, at least one further unit from the lot of a range which will bring the weight of the group to within said given range.

2. A device for use in assembling a number of units of product each having a weight falling within a predetermined range into a group having a weight falling within a given range, said device including a conveyor, said conveyor including at least one pan to hold said product, power means connected to said conveyor to move said pan in a given direction along a predetermined path, a first scale having a weight responsive element in said path to determine the weight of the product in said pan, a plurality of product holders along said path adjacent said scale each to receive product of a given weight range, means associated with said holders and operatively connected with said scale to indicate at the time the pan is adjacent the holders from which holder a unit should be taken to add to a partial group on said pan to make a subgroup having a weight falling within a first range, a second scale having a weight responsive element in said path beyond, in said direction, the weight responsive element of said first scale, a plurality of product holders along said path adjacent said second scale each to receive product of a given weight range, and means associated with said last mentioned holders and operatively connected with said second scale to indicate at the time the pan is adjacent the holders from which of said last mentioned holders a unit should be taken to add to a subgroup on said pan to bring the weight of the group to within said given range.

3. A device for use in assembling a number of units of product each having a weight falling within a predetermined range into a group having a weight falling within a given range, said device including a conveyor, said conveyor including at least one pan to hold said product, power means connected to said conveyor to move said pan in a given direction along a predetermined path, a plurality of trip fingers associated with each of said pans, each of said fingers being movable from an inactive to an active position, a first scale having a weight responsive element in said path to determine the weight of the product in the pan as the pan traverses the weight responsive element, coding means connected to said scale to move a selected finger from an inactive to an active position in response to the weight of the product in the pan as the pan traverses the weight responsive element, a plurality of product holders over said path beyond said weight responsive element in said direction, each of said holders having an actuating lever to discharge a unit from said holder, the respective levers of each of said holders being positioned to be actuated by a separate one of said fingers when that one finger is in the active position, means to return the fingers from the active to the inactive position after the fingers have actuated a lever of a holder, a second scale having a weight responsive element in said path beyond said holders in said direction to determine the weight of the product in the pan as the pan traverses the weight responsive element, coding means connected to said second scale to move a selected finger from an inactive to an active position in response to the weight of the product in the pan as the pan traverses the second weight responsive element, a plurality of product holders over said path beyond said scale in said direction, each of said holders having an actuating lever to discharge a unit from said holder, the respective levers of each of said holders being positioned to be actuated by a separate one of said fingers when that one finger is in the active position, and means to return the fingers from the active to the inactive position after the fingers have actuated a lever of a holder.

4. A device for use in assembling a number of units of product each having a weight falling within a predetermined range into a group having a weight falling within a given range, said device including a conveyor, said conveyor including at least one pan to hold said product, power means connected to said conveyor to move said pan in a given direction along a predetermined path, a first scale having a weight responsive element in said path to determine the weight of the product in said pan, a plurality of product holders along said path adjacent said scale each to receive product of a given weight range, and means associated with said holders and operatively connected with said scale to indicate at the time the pan is adjacent the holders from which holder a unit should be taken to add to a partial group on said pan to bring the weight of the group to within said given range.

5. A device for use in assembling a number of units of product each having a weight falling within a predetermined range into a group having a weight falling within a given range, said device including a conveyor, said conveyor including at least one pan to hold said product, power means connected to said conveyor to move said pan in a given direction along a predetermined path, a first scale having a weight responsive element in said path to determine the weight of the product in said pan, a plurality of product holders over said path beyond said scale in said direction each to receive product of a given weight range, each of said holders having an actuating lever to discharge a unit from said holder, and means operatively connected to said scale to indicate at the time the pan is adjacent the holders from which holder a unit should be taken to add to a partial group on said pan to bring the weight of the group to within said range and adapted to engage the lever of that holder and discharge a unit from said holder when said pan is below said holder.

6. A device for use in assembling a number of units of product each having a weight falling within a predetermined range into a group having a weight falling within a given range, said device including a conveyor, said conveyor including at least one pan to hold said product, power means connected to said conveyor to move said pan in a given direction along a predetermined path, a first scale having a weight responsive element in said path to determine the weight of the product in said pan, a plurality of product holders over said path beyond said scale in said direction each to receive product of a given weight range, each of said holders having an actuating lever to discharge a unit from said holder, trip means associated with said pan and adapted to be coded to selectively trip any of said levers when the pan is below the holders of which the levers are parts, and coding means operatively connected to said scale to code said trip means when the pan holding a partial group traverses said weight responsive element whereby as the pan passes below the desired holder an additional unit will be deposited in said pan to bring the weight of the group to within said range.

References Cited in the file of this patent

UNITED STATES PATENTS

| 1,981,697 | Hartmann | Nov. 14, 1934 |
| 2,198,788 | Popov | Apr. 30, 1940 |
| 2,470,916 | Carruthers | May 24, 1949 |
| 2,575,703 | Carruthers | Nov. 30, 1951 |

FOREIGN PATENTS

| 27,023 (1909) | Great Britain | May 10, 1910 |
| 302,366 | Great Britain | May 14, 1930 |
| 661,249 | Germany | June 15, 1938 |
| 501,117 | Great Britain | Feb. 21, 1939 |